Sept. 6, 1955  F. F. MELVIN  2,716,857
BROOM RAKE STRUCTURE
Filed Oct. 22, 1954  2 Sheets-Sheet 2

INVENTOR
Francis F. Melvin
By Herbert A. Minturn,
ATTORNEY

United States Patent Office 2,716,857
Patented Sept. 6, 1955

2,716,857
BROOM RAKE STRUCTURE
Francis F. Melvin, Elwood, Ind.

Application October 22, 1954, Serial No. 463,877

3 Claims. (Cl. 56—400.17)

This invention relates to a broom rake of an all metallic nature wherein there are a number of tines having generally straight lengths with down-turned outer free ends, and the tines are secured to a head piece without welding, and there is a handle socket member attached to the head in a manner to reinforce the head and resist bending during the raking action.

A primary object of the invention is to provide an exceedingly simple structure wherein there are a minimum number of parts capable of being assembled at a relatively low cost, and at the same time such parts may be assembled to produce an extremely durable structure over a long period of usage. A further important object of the invention is to provide such a structure which will be relatively light in nature and also wherein the tines will not have a tendency to work loose or to become distorted under usage. Further, as above indicated, it is an important object of the invention to provide a handle receiving socket member so attached to the rake proper that not only is the rake itself braced against distortion, but also the socket member is rigidly supported in its extension from the rake.

These and many other objects and advantages of the invention will become apparent to those versed in the art in the following description of one particular form of the invention as illustrated in the accompanying drawings, in which.

Figure 1:
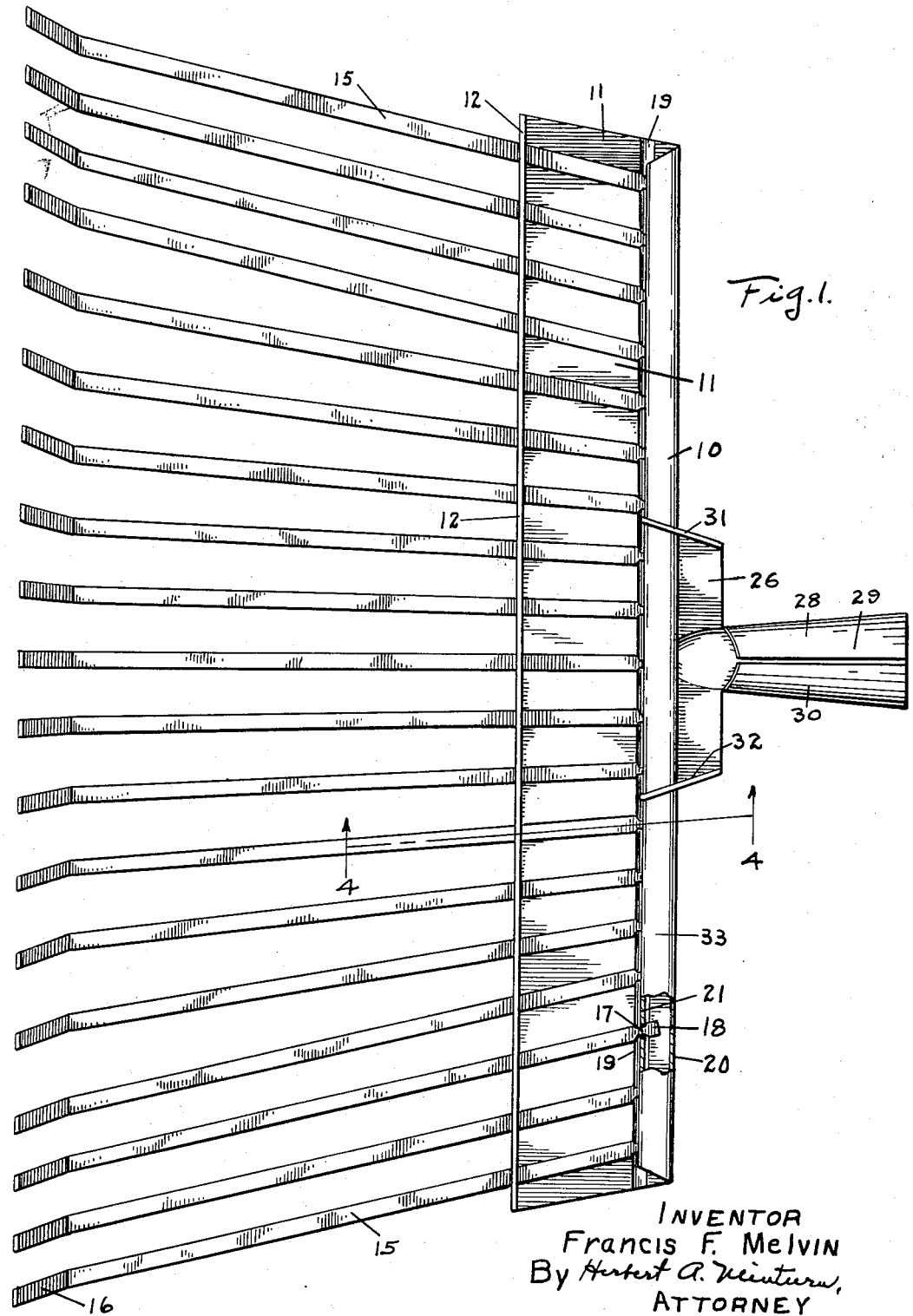
Fig. 1 is a view in bottom plan of a rake structure embodying the invention.

A head generally designated by the numeral 10 is formed to have a major flat area 11, from the forward end of which is downturned a flange 12 entirely along the front edge portion of the area 11. This flange 12 is provided with a plurality of slots 13, Fig. 4, immediately below the juncture of the flange 12 with the flat portion 11. There is one of these slots 13 for each of the tines 15 to be embodied in the rake. Each tine 15 has a down-turned toothed end 16, and the rear end portion of each tine has a reduced neck portion 17 adjacent the rear end 18 which has the full width of the tine.

Each tine 15 is inserted through a slot 13 and carried back over the face of the area 11 to have the neck 17 placed over a groove 19 carried throughout the entire length of the area 11 substantially parallel to the flange 12. The head 18 is positioned rearwardly of the groove 19, Fig. 1.

Figure 2:
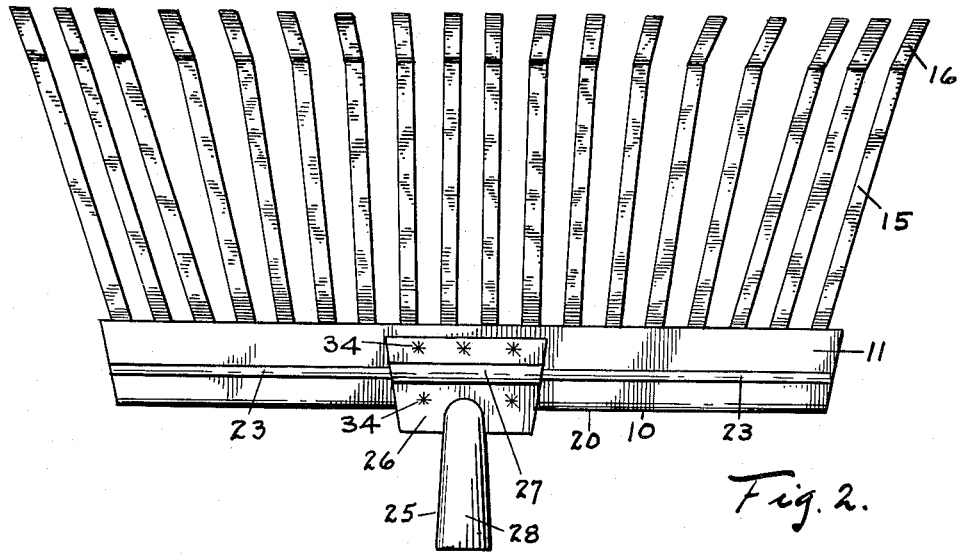
Fig. 2 is a view in top plan on a reduced scale.
Figure 3:
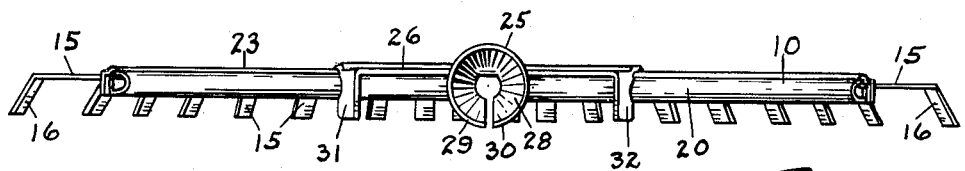
Fig. 3 is a view in rear elevation also on a reduced scale.

From the rear longitudinal edge of the flat area 11, the head turns around downwardly through a bend 20, Fig. 4, and thence forwardly in spaced relation below the rear end portion of the tines 15, and finally is turned upwardly by a flange 21 directly into the groove 19. The free edge of this flange 21 is notched at regular intervals to straddle the neck 17 of each of the tines 15, a notch 22 being indicated in Fig. 4. The flange 21 is pushed upwardly to grip the necks 17 and hold them securely so that the tines 15 can neither travel longitudinally through the flange 12 nor lift from the flat surface 11 against which they are forcibly urged by means of the flange 21. Thus it is to be seen that no welding or other holding means is required to retain the tines in regularly spaced apart intervals along the head 10, and to retain them against longitudinal travel in respect to the head 10. The groove 19 is rolled or pressed in the member 11 so that a rib 23 will be formed on the opposite top side of the head 10, Fig. 2.

A handle socket member generally designated by the numeral 25 is attached centrally to and along the head 10 to extend rearwardly therefrom. This member 25 has a generally flat plate 26 which laps over and fits against the top side of the head 10, Fig. 2, with a lateral rib 27 nesting over the top of the rib 23, the plate 26 extending to both sides from the rib 23.

A conical ferrule 28 is formed integrally from the plate 26 by two wings 29 and 30 formed to complete the conical projection rearwardly from the plate 26.

Figure 4:
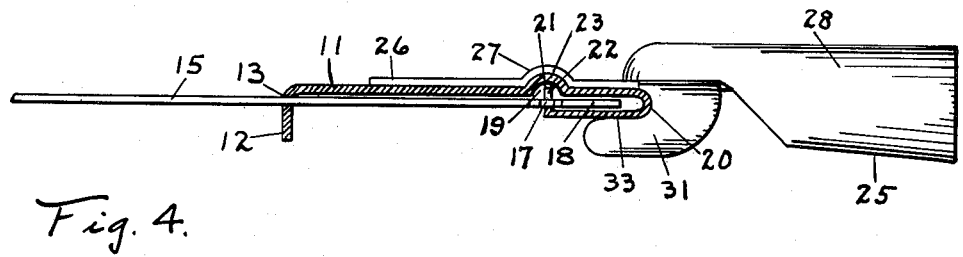
Fig. 4 is a view in section on a line 4—4 in Fig. 1.

The lateral ends of the plate 26 are turned downwardly into the flanges 31 and 32, each flange being notched to receive the bend 20 of the head 10 back thereunder as best indicated in Fig. 4. The forward ends of these flanges 31 and 32 extend for substantially the major distance across the under side of the folded under portion 33 of the head 10 between the bend 20 and the flange 21. These flanges 31 and 32 form a snug fit over the area and not only tend to reinforce the socket 28 from bending vertically in respect to the head 10, but also serve to keep the flange 21 in firm contact with the tines 15. The forward end portion of the plate 26 is secured to the head 10 by any suitable means, herein shown as by a series of spot welds 34.

With the plate 26 being on the top side of the head 10, the pressure in operation of the rake is downwardly from the handle socket 28 against that head, and the head 10 is prevented from rocking downwardly by its rear end such as along the fold 20 by reason of the under engaging flanges 31 and 32.

While I have herein shown and described my invention in the one particular form, it is obvious that structural changes may be employed without departing from the spirit of the invention, and I therefore do not desire to be limited to that precise form beyond the limitations which may be imposed by the following claims.

I claim:

1. A broom rake structure comprising a head having a major flat area across its lateral length; a flange downturned from its front edge and having a plurality of spaced apart slots therethrough adjacent the juncture of the flange with the flat area; a plurality of tines, one tine extending through each of said slots and lying by a rear portion under and against said area; a restricted neck in each tine; a head portion spaced under and along said area across its rear end portion and carried integrally by said area through a rear bend therefrom; an upturned flange along the front of said portion having a free edge notched at regular intervals to fit over said necks; a handle member plate extending over the top side of said head area and secured thereto; a flange downturned from each lateral end of said plate fitting around said bend and extending forwardly under said portion in engagement therewith, holding said bend against spreading; and a handle receiving member extending rearwardly from said plate.

2. The structure of claim 1 in which said area has a groove extending thereacross above said necks, and into which groove said portion free edge enters.

3. The structure of claim 2 in which there is a rib over said groove along the top side of said area and there is a groove across said plate nesting over said rib setting up a resistance to travel of the plate rearwardly over said head and retaining said plate flanges in position under said head portion.

References Cited in the file of this patent

UNITED STATES PATENTS

| 2,313,691 | Whittenberger | Mar. 9, 1943 |
| 2,481,697 | Sharpe | Sept. 13, 1949 |
| 2,672,006 | Melvin | Mar. 16, 1954 |